United States Patent
Kanzaki (10) Patent No.: US 9,870,865 B2
(45) Date of Patent: Jan. 16, 2018

(54) MULTILAYER CERAMIC CAPACITOR INCLUDING A PEROVSKITE COMPOUND

(71) Applicant: Murata Manufacturing Co., Ltd., Nagaokakyo-shi, Kyoto-fu (JP)

(72) Inventor: Taisuke Kanzaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 12 days.

(21) Appl. No.: 14/885,101

(22) Filed: Oct. 16, 2015

(65) Prior Publication Data

US 2016/0118191 A1    Apr. 28, 2016

(30) Foreign Application Priority Data

Oct. 23, 2014  (JP) .................................. 2014-216397

(51) Int. Cl.
*H01G 4/30* (2006.01)
*H01G 4/12* (2006.01)
*H01G 4/008* (2006.01)

(52) U.S. Cl.
CPC ............. *H01G 4/30* (2013.01); *H01G 4/0085* (2013.01); *H01G 4/1227* (2013.01)

(58) Field of Classification Search
CPC ....... H01G 4/30; H01G 4/0085; H01G 4/1227
See application file for complete search history.

(56) References Cited

U.S. PATENT DOCUMENTS

| | | | | |
|---|---|---|---|---|
| 5,196,757 A | * | 3/1993 | Omatsu | H01L 41/083 310/328 |
| 7,158,364 B2 | * | 1/2007 | Miyauchi | H01G 4/30 361/303 |
| 8,964,354 B2 | * | 2/2015 | Park | H01G 4/129 361/303 |

(Continued)

FOREIGN PATENT DOCUMENTS

| | | |
|---|---|---|
| JP | 2004-311985 A | 11/2004 |
| JP | 2005-223313 A | 8/2005 |

(Continued)

OTHER PUBLICATIONS

Official Communication issued in corresponding Korean Patent Application No. 10-2015-0146776, dated Sep. 13, 2016.

*Primary Examiner* — David M Sinclair
(74) *Attorney, Agent, or Firm* — Kaeting & Bennett, LLP (57) ABSTRACT

A multilayer ceramic capacitor includes a ceramic multilayer body including dielectric ceramic layers and inner electrodes laminated with the dielectric ceramic layers interposed therebetween, wherein the dielectric ceramic layers include a perovskite compound containing Ba and Ti, and the inner electrodes (a) contain Ni as a main component, (b) include segregation with the perovskite compound containing Ba and Ti, which is scattered in the inner electrodes and embedded in the inner electrodes, in amount equal to or higher than about 2%, and (c) include columnar segregation with the perovskite compound containing Ba and Ti, which penetrates through the inner electrodes from one main (Continued)

surface side to the other main surface side, in an amount equal to or lower than about 5%, or do not include the columnar segregation. Further, an average thickness of the inner electrodes is equal to or smaller than about 0.4 µm.

9 Claims, 4 Drawing Sheets

(56) References Cited

U.S. PATENT DOCUMENTS

| | | | |
|---|---|---|---|
| 2005/0152095 A1 | 7/2005 | Nakano et al. | |
| 2012/0147521 A1* | 6/2012 | Kim | H01B 1/22 361/321.2 |
| 2012/0250217 A1* | 10/2012 | Fukunaga | H01G 4/012 361/301.4 |
| 2013/0027842 A1* | 1/2013 | Kim | H01G 4/30 361/321.2 |
| 2013/0049532 A1* | 2/2013 | Kim | H01G 4/0085 310/311 |
| 2013/0222973 A1* | 8/2013 | Wada | H01G 4/005 361/321.2 |
| 2013/0286538 A1* | 10/2013 | Kim | H01G 4/30 361/303 |
| 2013/0286539 A1* | 10/2013 | Kim | H01G 4/01 361/303 |
| 2014/0177133 A1* | 6/2014 | Lee | H01G 4/1209 361/321.4 |
| 2014/0240898 A1* | 8/2014 | Kim | H01G 4/30 361/303 |
| 2014/0355177 A1* | 12/2014 | Lee | H01G 4/012 361/321.2 |
| 2015/0027764 A1* | 1/2015 | Lee | H01G 4/30 174/260 |

FOREIGN PATENT DOCUMENTS

| | | |
|---|---|---|
| JP | 2011-207696 A | 10/2011 |
| KR | 10-2014-0107963 A | 9/2014 |

* cited by examiner

MULTILAYER CERAMIC CAPACITOR INCLUDING A PEROVSKITE COMPOUND

BACKGROUND OF THE INVENTION

1. Field of the Invention

The present invention relates to a multilayer ceramic capacitor, and a multilayer ceramic capacitor including a ceramic multilayer body (capacitor main body) including a plurality of dielectric ceramic layers and a plurality of inner electrodes laminated with the dielectric ceramic layers interposed therebetween.

2. Description of the Related Art

In recent years, a small-sized multilayer ceramic capacitor capable of having a large capacitance has been widely used with reduction of an electronic apparatus in size and weight. For example, the multilayer ceramic capacitor having a configuration in which outer electrodes are arranged on a ceramic multilayer body (capacitor main body) having a plurality of dielectric ceramic layers and a plurality of inner electrodes arranged on a plurality of interfaces between the dielectric ceramic layers so as to conduct with the above-mentioned inner electrodes has been widely used.

As such a multilayer ceramic capacitor, Japanese Unexamined Patent Application Publication No. 2011-207696 disclosed a multilayer ceramic capacitor (multilayer porcelain capacitor) in which inner electrodes formed with nickel are arranged in a dielectric using a dielectric porcelain composition containing barium titanate as a main component and containing about 5 to 15 mol of a component expressed by $(1-x)BaZrO_3+xSrZrO_3$ in terms of $BaZrO_3$ and $SrZrO_3$, about 3 to 5 mol of Mg oxide in terms of MgO, about 4 to 6 mol of oxide of a rare-earth element in terms of $R_2O_3$, about 0.5 to 1.5 mol of oxide of at least one element selected from Mn, Cr, Co, and Fe in terms of $MnO$, $Cr_2O_3$, $CO_3O_4$, and $Fe_2O_3$, about 2.5 to 4 mol of a compound containing Si in terms of Si relative to about 100 mol of barium titanate, wherein x is about 0.4 to 0.9.

The above-mentioned dielectric porcelain composition has a high relative dielectric constant under high intensity of an electric field and has preferable temperature characteristics and reliability even when the dielectric ceramic layers are thinned. Therefore, the multilayer ceramic capacitor using the dielectric porcelain composition, which is preferable in high-temperature load lifetime, can be also obtained.

However, in recent years, the dielectric ceramic layers and the inner electrodes are increasingly thinned and multilayered in order to reduce the size of the multilayer ceramic capacitor and increase the capacitance of the multilayer ceramic capacitor. With this, problems of structural defects such as generation of cracks and delamination and a decrease in coverage of the inner electrodes become significant and a multilayer ceramic capacitor having higher reliability has been required.

SUMMARY OF THE INVENTION

Preferred embodiments of the present invention provide a multilayer ceramic capacitor with no structural defects, with reduced or no decrease in coverage of inner electrodes as a ratio at which the inner electrodes cover dielectric ceramic layers, and with high reliability.

According to an aspect of various preferred embodiments of the present invention, a multilayer ceramic capacitor includes a ceramic multilayer body including a plurality of dielectric ceramic layers and a plurality of inner electrodes laminated with the dielectric ceramic layers interposed therebetween, and outer electrodes arranged on the ceramic multilayer body so as to conduct with the inner electrodes, wherein the dielectric ceramic layers include a perovskite compound containing Ba and Ti, the inner electrodes (a) contain Ni as a main component, (b) include segregation with a perovskite compound containing Ba and Ti, which is scattered in the inner electrodes so as to be embedded in the inner electrodes, in an amount equal to or higher than about 2%, and (c) include columnar segregation with a perovskite compound containing Ba and Ti, which penetrates through the inner electrodes from one main surface side to the other main surface side, in an amount equal to or lower than about 5%, or do not include the columnar segregation.

In a multilayer ceramic capacitor according to an aspect of various preferred embodiments of the present invention, it is preferable that an average thickness of the inner electrodes be equal to or smaller than about 0.4 μm, for example.

The average thickness of the inner electrodes is preferably set to be equal to or smaller than about 0.4 μm, for example, so as to provide more significant effects of suppressing or preventing structural defects and decreases in the coverage of the inner electrodes.

As described above, a multilayer ceramic capacitor according to a preferred embodiment of the present invention has a configuration in which the inner electrodes containing Ni as the main component (a) include the segregation with the perovskite compound containing Ba and Ti, which is scattered in the inner electrodes so as to be embedded in the inner electrodes, in an amount equal to or higher than about 2%, and (b) include the columnar segregation with the perovskite compound containing Ba and Ti, which penetrates through the inner electrodes from one main surface side to the other main surface side, in amount equal to or lower than about 5%, or do not include the columnar segregation. Therefore, a coefficient of linear expansion of the inner electrodes containing Ni as the main component is closer to a coefficient of linear expansion of the dielectric ceramic layers. With this, the multilayer ceramic capacitor with high reliability while causing no generation of structural defects such as cracks and delamination and no decrease in the coverage of the inner electrodes due to differences in the coefficient of linear expansion between the dielectric ceramic layers and the inner electrodes is provided.

It should be noted that a content of the columnar segregation penetrating through the inner electrodes is preferably small, or no columnar segregation may be provided, because the columnar segregation decreases coverage of the inner electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention are explained more in detail below.

First Preferred Embodiment

1. Manufacturing of Barium Titanate Powder

In order to obtain a dielectric ceramic material, powders of $BaCO_3$ and $TiO_2$ each having purity of equal to or higher than about 99% by weight were prepared at a ratio of Ba:Ti=1:1.

Subsequently, the prepared powder was wet mixed by a ball mill, was uniformly dispersed, and then, was subjected to drying processing so as to obtain prepared powder. The obtained prepared powder was fired at about 1000° C. so as to obtain barium titanate powder as the main component powder having a mean diameter of about 150 nm.

On the other hand, powders (sub component powders) of $MgO$, $Al_2O_3$, $V_2O_5$, $MnO_2$, $Dy_2O_3$, and $SiO_2$ were prepared as sub components.

Then, the powders of $MgO$, $Al_2O_3$, $V_2O_5$, $MnO_2$, $Dy_2O_3$, and $SiO_2$ were weighed such that contents of Mg, Al, V, Mn, Dy, and Si relative to Ti about 100 mol parts are predetermined contents (Mg about 1.3 mol parts, Al about 0.5 mol parts, V about 0.1 mol parts, Mn about 0.1 mol parts, Dy about 1.0 mol part, and Si about 1.5 mol parts) and were added to the above-mentioned main component powder so as to obtain mixed powder.

The mixed powder was wet mixed by the ball mill, was uniformly dispersed, and then, was subjected to drying processing so as to obtain a dielectric ceramic material.

2. Manufacturing of Ceramic Green Sheet for Dielectric Ceramic Layer

Next, a polyvinyl butyral-based binder, a plasticizer, and ethanol as an organic solvent were added to the dielectric ceramic material and they were wet mixed by the ball mill so as to manufacture ceramic slurry. The ceramic slurry was sheet-molded by a lip method so as to obtain a substantially rectangular ceramic green sheet.

3. Manufacturing of Conductive Pastes

Ni powder having a mean diameter of about 0.2 μm as a conductive component was prepared. Further, in the same manner as the above-mentioned barium titanate powder as the main component powder, additive barium titanate powder having a mean diameter of about 0.02 μm, which is to be added to the conductive pastes, was prepared.

Additive $Dy_2O_3$ powder and additive MgO powder were prepared such that Dy is about 1.0 mol part and Mg is about 1.3 mol parts relative to Ti about 100 mol parts in the above-mentioned additive barium titanate powder.

Further, an organic vehicle obtained by dissolving ethyl cellulose in terpineol was prepared.

Then, the powders (Ni powder, additive barium titanate powder, additive MgO powder, additive $Dy_2O_3$ powder) prepared as described above were dispersed in the organic vehicle using a triple roll mill so as to manufacture conductive pastes for forming the inner electrodes.

Blending amounts of the additive powders (additive barium titanate, additive MgO powder, additive $Dy_2O_3$ powder) were set such that the additive powders occupy percentages (wt %) as indicated in Table 1 relative to Ni about 100 weight parts in the Ni powder.

4. Manufacturing of Multilayer Ceramic Capacitor 4-1. Printing of Ceramic Green Sheet with Conductive Pastes The ceramic green sheet was screen-printed with the conductive pastes manufactured as described above so as to form a conductive paste film (inner electrode pattern) that would define the inner electrodes.

4-2. Lamination

Subsequently, 300 ceramic green sheets with the conductive paste film formed thereon were laminated such that sides at which the conductive paste films are drawn are positioned alternately. Further, outer-layer ceramic green sheets with no conductive paste film formed thereon are laminated on the 300 ceramic green sheets at both sides in the lamination direction so as to obtain a non-calcined multilayer body that would define a capacitor main body after calcined.

4-3. Calcination

The obtained multilayer body was heated for about 3 hours at a temperature of about 350° C. in $N_2$ atmosphere so as to bake the binder. Thereafter, the multilayer body was kept for about 10 minutes at a rate of temperature increase of about 100° C./min and at a maximum temperature of about 1200° C. and was calcined under a condition of reducing atmosphere of $H_2$—$N_2$—$H_2O$ gas having oxygen partial pressure of about $10^{-4}$ MPa. Further, the rate of temperature decrease was set as indicated in Table 1. As a result, the calcined capacitor main body (ceramic multilayer body) was obtained.

4-4. Formation of Outer Electrodes

Subsequently, Cu pastes containing glass frit were applied to both the end surfaces of the above-mentioned capacitor main body and were baked at a temperature of about 800° C. in $N_2$ atmosphere so as to form the outer electrodes that are electrically connected to the inner electrodes.

With this, multilayer ceramic capacitors (samples) 50 of sample numbers 1 to 10 in Table 1 were obtained. Each of the multilayer ceramic capacitors (samples) 50 has the configuration as illustrated in FIG. 1 and FIG. 2.

The outer dimensions of each of the multilayer ceramic capacitors obtained as described above were set as follows. That is, a length L was about 1.0 mm, a width W was about 0.5 mm, and a thickness T was about 0.5 mm, each dimension L, W and T in FIG. 2 was set as length, width and thickness, respectively.

4-5. Configuration of Multilayer Ceramic Capacitor

Figure 1:
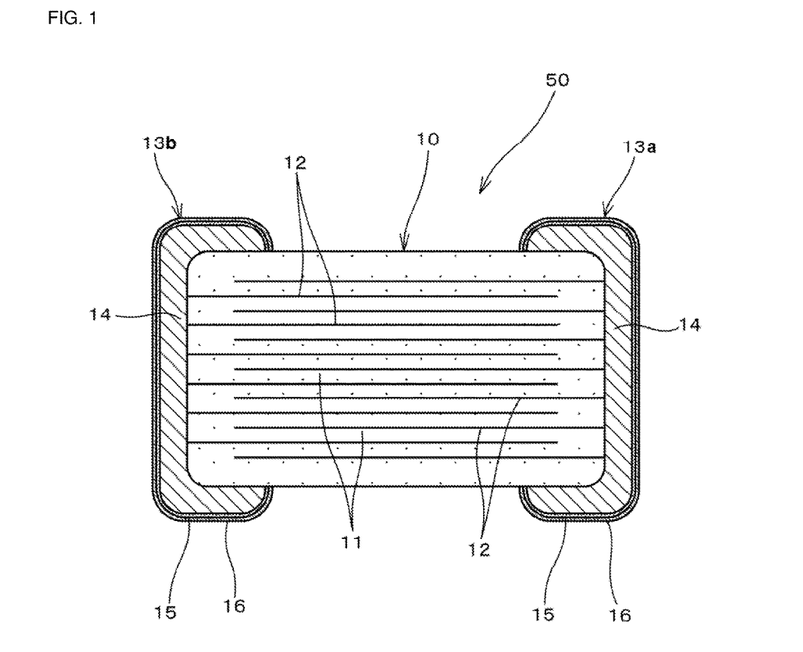
FIG. 1 is a cross-sectional view illustrating the configuration of a multilayer ceramic capacitor according to a preferred embodiment of the present invention.
Figure 2:
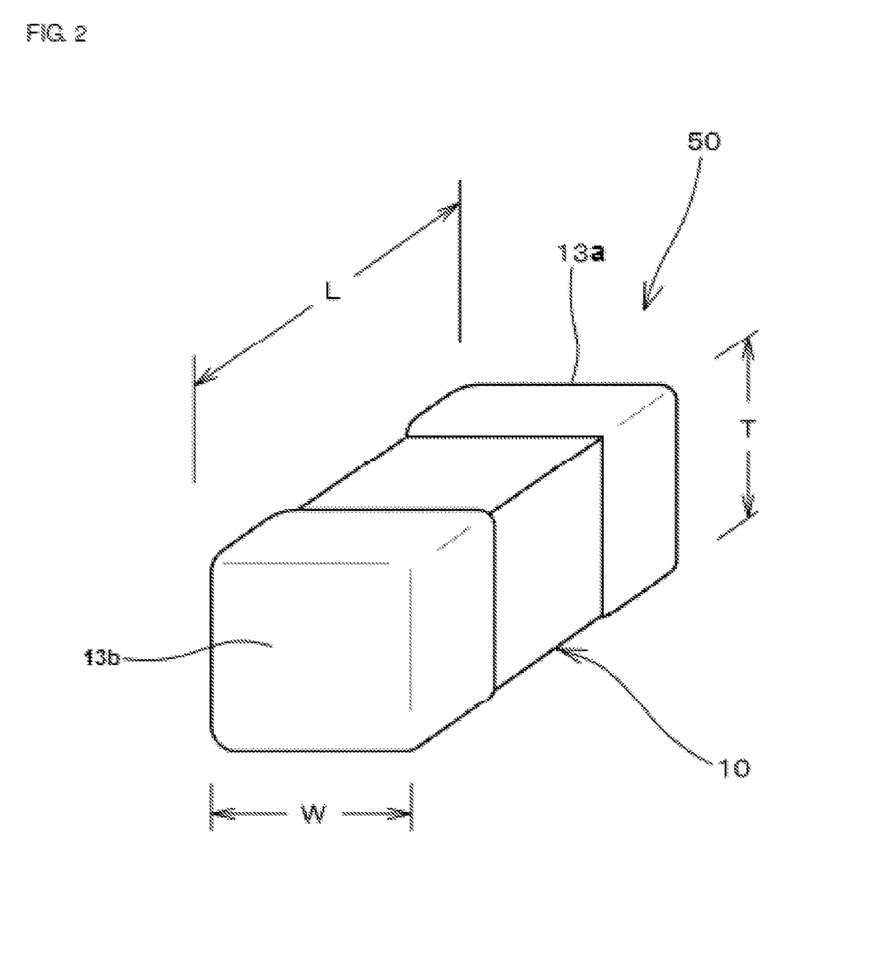
FIG. 2 is a perspective view illustrating the configuration of the multilayer ceramic capacitor according to a preferred embodiment of the present invention.

As illustrated in FIG. 1 and FIG. 2, the multilayer ceramic capacitor 50 has a configuration including a ceramic multilayer body (capacitor main body) 10 and a pair of outer electrodes 13a and 13b. The ceramic multilayer body (capacitor main body) 10 includes a plurality of laminated dielectric ceramic layers 11 and a plurality of inner electrodes 12 arranged on a plurality of interfaces between the dielectric ceramic layers 11. The outer electrodes 13a and 13b include Cu paste 14 arranged on both of the end surfaces of the ceramic multilayer body 10 so as to conduct with the inner electrodes 12 that are alternately drawn to the opposite end surfaces. It should be noted that the outer electrodes 13a and 13b may include plated layers 15 and 16 that may include Ni plated layers or Sn plated layers.

Figure 3:
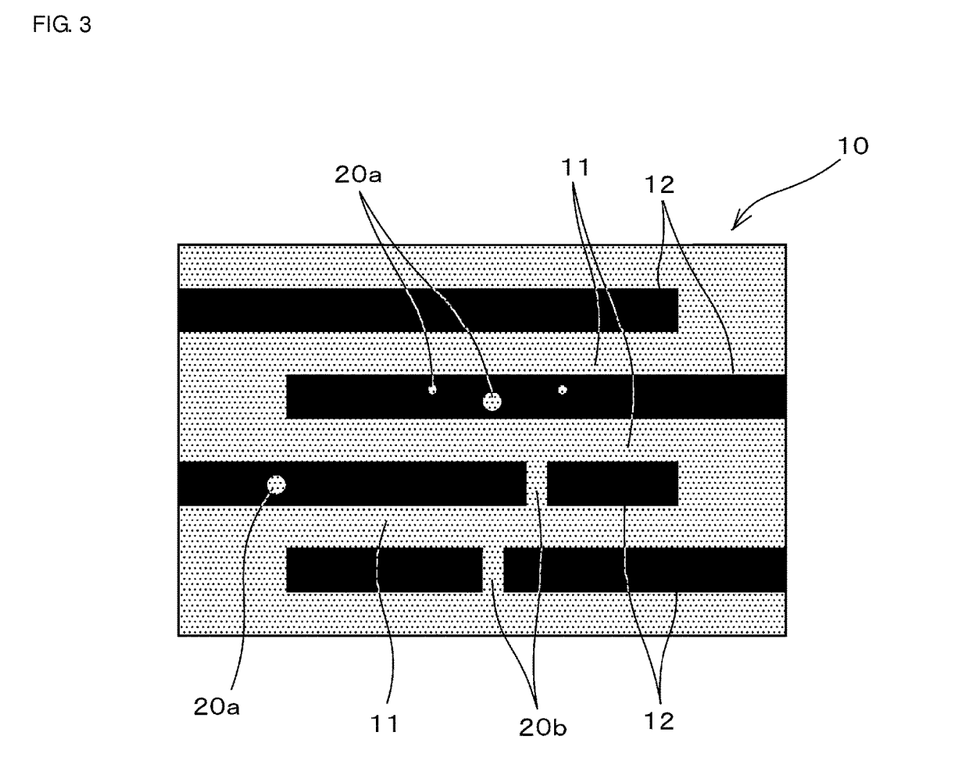
FIG. 3 is a view schematically illustrating a state where segregation that is scattered in inner electrodes so as to be embedded in the inner electrodes and columnar segregation penetrating through the inner electrodes are present in a multilayer ceramic capacitor according to a preferred embodiment of the present invention.

In the multilayer ceramic capacitor 50 according to the present preferred embodiment of the present invention, as schematically illustrated in FIG. 3, the inner electrodes 12 include segregation 20a scattered in the inner electrodes 12 so as to be entirely embedded in the inner electrodes 12 and columnar segregation 20b penetrating through the inner electrodes 12 from one main surface side to the other main surface side (in the thickness direction). The segregation 20a scattered in the inner electrodes 12 is surrounded by the inner electrodes 12. The columnar segregation 20b penetrating through the inner electrodes 12 makes contact with two dielectric ceramic layers 11 arranged at the upper and lower sides of the inner electrodes 12 in the thickness direction.

The segregation 20a scattered so as to be entirely embedded in the inner electrodes 12 without penetrating through the inner electrodes 12 decreases a difference between a coefficient of linear expansion of the inner electrodes 12 containing Ni as the main component and a coefficient of linear expansion of the dielectric ceramic layers 11. Therefore, the segregation 20a prevents generation of structural defects such as cracks and delamination from occurring, and significantly reduces or prevents decreases in coverage of the inner electrodes as a ratio at which the inner electrodes cover the dielectric ceramic layers.

On the other hand, the columnar segregation 20b penetrating through the inner electrodes 12 decreases the coverage (ratio at which the inner electrodes 12 cover the dielectric ceramic layers 11) of the inner electrodes 12. Therefore, the content of the columnar segregation 20b is preferably small and more preferably, no columnar segregation 20b may be contained.

5. Abundance Ratio of Segregation with Perovskite Compound Containing Ba and Ti, which is Scattered in Inner Electrodes For samples of the sample numbers 1 to 10 in Table 1, which were manufactured as described above, an abundance ratio of the segregation 20a scattered in the inner electrodes 12, that is, the segregation 20a (see FIG. 3) with the perovskite compound containing Ba and Ti, which was scattered so as to be entirely embedded in the inner electrodes 12 without penetrating through the inner electrodes 12, was examined by a method as will be described later. In the present preferred embodiment, the abundance ratio of the above-mentioned segregation 20a was examined by TEM-EDX analysis.

Hereinafter, a method of checking the abundance ratio of the segregation scattered in the inner electrodes will be described with reference to FIG. 4.

First, samples (multilayer ceramic capacitors) in Table 1 were prepared three by three and peripheries of the respective samples were solidified with resin in such a manner that the surfaces (LT surfaces) of the samples, which were defined by the length direction (L direction) and the thickness direction (T direction), were exposed.

Subsequently, the LT side surfaces of the samples were polished by a polishing machine. In this case, polishing was performed to the depth of approximately ¼ of the samples in the width direction (W direction) so as to expose the LT surfaces (LT polished end surfaces) as polished surfaces. Then, in order to eliminate the droop of the inner electrodes due to the polishing, the polished surfaces were processed by ion milling after the polishing was finished.

Figure 4:
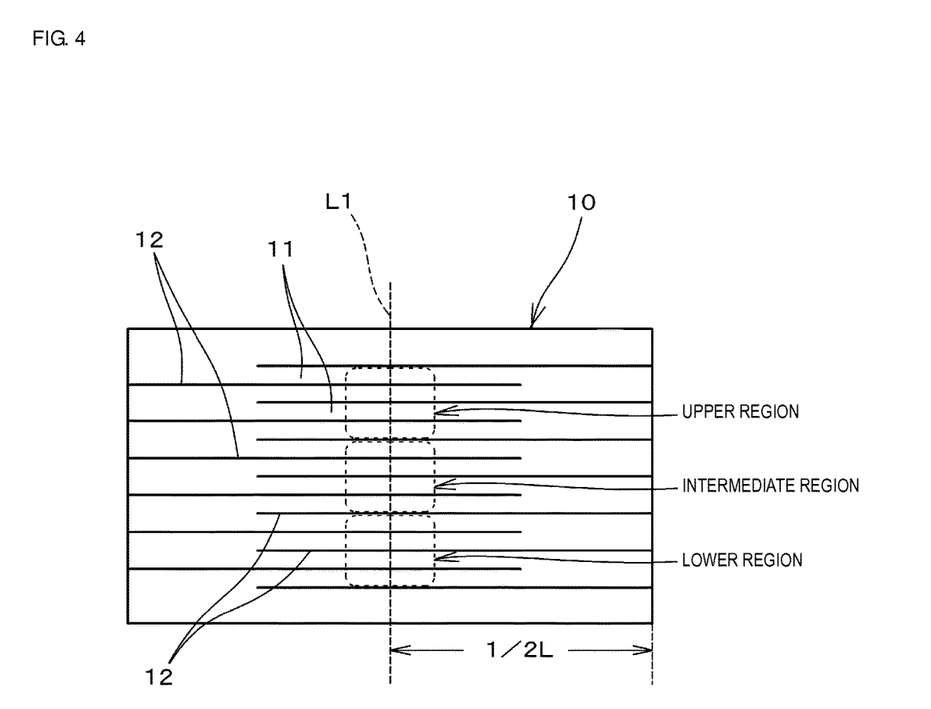
FIG. 4 is a view for explaining a method of examining an abundance ratio of segregation with a perovskite compound containing Ba and Ti, which is included in the inner electrode, and a method of examining the average thickness of the inner electrodes.

Thereafter, as illustrated in FIG. 4, regions in which the inner electrodes 12 were laminated at the center in the L direction were divided into three equal portions so as to be sectioned into three regions of upper regions, intermediate regions, and lower regions. Then, the vicinities of the center portions of the respective regions were thinned so as to manufacture thinned samples each having the thickness of about 100 nm.

In the same manner, thinned samples were manufactured on portions at approximately ½ depth and at approximately ¾ depth of the samples in the width direction (W direction). Accordingly, 27 thinned samples in total of three samples× three polished surfaces×three regions were manufactured.

A visual field range of observation in each region in the longitudinal direction (lamination direction, T direction) was set to a range in which two inner electrodes could be observed in the lamination direction. Further, a visual field range of observation in the lateral direction (direction perpendicular to the lamination direction, L direction) was set to the length same as that of the visual field range in the lamination direction (T direction).

Then, the area (including regions in which the scattered segregation 20a with the perovskite compound containing Ba and Ti was present and regions in which the columnar segregation 20b with the perovskite compound containing Ba and Ti was present) of the inner electrodes in an image and the area of the scattered segregation 20a with the perovskite compound containing Ba and Ti were obtained based on a result of the TEM-EDX analysis using image processing software.

Thereafter, the abundance ratio of the segregation 20a scattered in the inner electrodes 12 was obtained by the following equation (1).

$$\text{Abundance ratio of segregation scattered in inner electrodes (\%)} = (\text{area of scattered segregation}/\text{area of inner electrodes}) \times 100 \quad (1)$$

It should be noted that the abundance ratio of the segregation scattered in the inner electrodes in the present preferred embodiment is an average value of the thinned 27 samples.

The abundance ratio (%) of the segregation scattered in the inner electrodes, which was obtained in the above-mentioned manner, is indicated in Table 1.

6. Abundance Ratio of Columnar Segregation with Perovskite Compound Containing Ba and Ti, which Penetrates Through Inner Electrodes The abundance ratio of the columnar segregation with the perovskite compound containing Ba and Ti, which penetrates through the inner electrodes, was obtained by the WDX analysis using a method as will be described later.

Hereinafter, a method of checking the abundance ratio of the columnar segregation penetrating through the inner electrodes will be described with reference to FIG. 4.

First, the samples (multilayer ceramic capacitors) in Table 1 were prepared three by three and peripheries of the respective samples were solidified with resin in such a manner that the surfaces (LT surfaces) of the samples, which were defined by the length direction (L direction) and the thickness direction (T direction), were exposed.

Subsequently, the LT side surfaces of the samples were polished by the polishing machine. In this case, polishing was performed to the depth of approximately ¼ of the samples in the width direction (W direction) so as to expose the LT surfaces (LT polished end surfaces) as polished surfaces. Then, in order to eliminate the droop of the inner electrodes due to the polishing, the polished surfaces were processed by ion milling after the polishing was finished.

As illustrated in FIG. 4, in the polished samples, regions in which the inner electrodes 12 were laminated were divided into three equal portions so as to be sectioned into three regions of upper regions, intermediate regions, and lower regions at approximately ½ positions of the LT polished end surfaces of the samples in the L direction.

The WDX analysis was performed in the vicinity of the center portion of each region. A visual field range of observation in each region in the longitudinal direction (lamination direction, T direction) was set to a range in which five inner electrodes could be observed in the lamination direction. A visual field range of observation in each region in the lateral direction (direction perpendicular to the lamination direction, L direction) was set to the length same as that of the visual field range in the lamination direction (T direction).

In the same manner, the WDX analysis was performed on portions at approximately ½ depth and at approximately ¾ depth of the samples in the width direction (W direction). Accordingly, the WDX analysis was performed at 27 places in total of three samples×three polished surfaces×three regions.

The area (including regions in which the scattered segregation 20a with the perovskite compound containing Ba and Ti was present and regions in which the columnar segregation 20b with the perovskite compound containing Ba and Ti was present) of the inner electrodes in an image and the area of the columnar segregation with the perovskite compound containing Ba and Ti, which penetrated through the inner electrodes, were obtained using image processing software.

Then, the abundance ratio of the columnar segregation 20b penetrating through the inner electrodes 12 was obtained by the following equation (2).

Abundance ratio of columnar segregation penetrating through inner electrodes (%)=(area of columnar segregation penetrating through inner electrodes/area of inner electrodes)×100    (2)

It should be noted that the abundance ratio of the columnar segregation penetrating through the inner electrodes in the present preferred embodiment is an average value of three samples×three polished surfaces×three regions.

The abundance ratio (%) of the columnar segregation penetrating through the inner electrodes, which was obtained as described above, is indicated in Table 1.

7. Measurement of Average Thickness of Inner Electrodes

The thickness of the inner electrode layer was measured using a scanning electron microscope. Hereinafter, a method of measuring the average thickness of the inner electrodes will be described with reference to FIG. 4.

First, the samples (multilayer ceramic capacitors) in Table 1 were prepared three by three and peripheries of the respective samples were solidified with resin in such a manner that the surfaces (LT surfaces) of the samples, which were defined by the length direction (L direction) and the thickness direction (T direction), were exposed.

Subsequently, the LT side surfaces of the samples were polished by the polishing machine. In this case, polishing was performed to the depth of approximately ½ of the samples in the width direction (W direction) so as to expose the LT surfaces (LT polished end surfaces) as polished surfaces. Then, in order to eliminate the droop of the inner electrodes due to the polishing, the polished surfaces were processed by ion milling after the polishing was finished.

In the polished samples, the thicknesses of the inner electrodes were measured. In order to measure the thicknesses of the inner electrodes, as illustrated in FIG. 4, a straight line L1 that is perpendicular or substantially perpendicular to the inner electrodes 12 is drawn (imaged) at an approximately ½ position of the LT polished end surfaces of the samples in the L direction.

Then, regions of the samples in which the inner electrodes 12 are laminated were divided into three equal portions so as to be sectioned into three regions of upper regions, intermediate regions, and lower regions.

Five inner electrodes on the straight line L1 except the outermost inner electrodes of each region were selected randomly on each region and the thicknesses thereof were measured. It should be noted that the thicknesses of the inner electrode layers were measured using the scanning electron microscope.

Accordingly, the average thickness of the inner electrodes in the first preferred embodiment is an average value of the thicknesses of the inner electrodes at 45 places of three samples×three regions×five layers.

It should be noted that portions the thicknesses of which were incapable of being measured due to defect or the like of the inner electrodes were excluded from a measurement target.

The average thickness of each of the inner electrodes, which was obtained as described above, is indicated in Table 1.

8. Measurement of Coverage of Inner Electrodes

A coverage as a ratio at which the inner electrodes covered the dielectric ceramic layers in the arrangement regions of the inner electrodes 12 was measured by the following method.

First, the samples (multilayer ceramic capacitors) in Table 1 were prepared five by five, and the ceramic multilayer bodies (capacitor main bodies) were stripped and divided along the interfaces between the inner electrodes and the dielectric ceramic layers in the vicinities of the center portions thereof in the T direction. The vicinities of the center portions (at approximately ½ positions of the ceramic multilayer bodies in the L direction and approximately ½ positions of the ceramic multilayer bodies in the W direction) of the inner electrodes exposed in this manner were observed by a microscope of about 500 magnifications and microscope pictures of about 500 magnifications were taken. Then, image processing was performed on the pictures so as to quantify the coverage of the inner electrodes (ratio of regions in which the inner electrodes were present) and obtain an average value thereof.

When the coverage of the inner electrodes becomes lower than about 80%, desired electrostatic capacity cannot be obtained and it is not preferable.

A measurement result of the coverage of the inner electrodes is indicated in Table 1.

9. Check of Generation State of Structural Defect

In order to examine a generation state of structural defects, the number of samples in which delamination or crack was generated was examined by the following method.

First, the samples (multilayer ceramic capacitors) in Table 1 were prepared 72 by 72. Presence or absence (the number of samples) of generation of the delamination or the crack was examined by ultrasonic inspection for the prepared samples.

A result thereof is indicated in Table 1. In Table 1, a relation between the number of samples in which any of the delamination or the crack was generated and the number of samples subjected to the test (the number of samples in which any of the delamination or the crack was generated/ the number of samples subjected to the test) is indicated in Table 1.

A sample of the sample number with an asterisk is a sample out of the scope of the present invention in Table 1.

In Table 1, as for additives, a percentage (wt %) of the additive barium titanate powder relative to Ni about 100 weight parts configuring the inner electrodes is indicated.

TABLE 1

| SAMPLE NUMBER | ADDITIVE AMOUNT (WT % RELATIVE TO Ni) | AVERAGE THICKNESS OF INNER ELECTRODES (μM) | RATE OF TEMPERATURE DECREASE (° C./MIN) | ABUNDANCE RATIO OF COLUMNAR SEGREGATION (%) | ABUNDANCE RATIO OF SCATTERED SEGREGATION (%) | INNER ELECTRODE COVERAGE (%) | STRUCTURAL DEFECT (%) |
|---|---|---|---|---|---|---|---|
| 1 | 15 | 0.7 | 100 | 5 | 3 | 80 | 0/72 |
| 2 | 10 | 0.7 | 100 | 2 | 3 | 85 | 0/72 |
| 3 | 5 | 0.7 | 100 | 2 | 2 | 85 | 0/72 |
| 4 | 15 | 0.4 | 100 | 3 | 2 | 83 | 0/72 |
| 5 | 15 | 0.3 | 100 | 3 | 2 | 80 | 0/72 |
| 6* | 20 | 0.7 | 100 | 8 | 2 | 60 | 0/72 |
| 7* | 1 | 0.7 | 100 | 0 | 1 | 70 | 3/70 |
| 8* | 15 | 0.7 | 2 | 3 | 1 | 65 | 4/70 |
| 9* | 15 | 0.4 | 2 | 3 | 1 | 50 | 10/70 |
| 10* | 15 | 0.3 | 2 | 3 | 1 | 45 | 12/70 |

Evaluation

As indicated in Table 1, in the cases of the samples of the sample numbers 1 to 5 in which a content of the segregation with the perovskite compound containing Ba and Ti, which was scattered in the inner electrodes, was equal to or higher than about 2% and a content of the columnar segregation with the perovskite compound containing Ba and Ti, which penetrated through the inner electrodes from the one main surface side to the other main surface side, was equal to or lower than about 5%, that is, in the cases of the samples satisfying requirements of the present invention, it was confirmed that a multilayer ceramic capacitor having the coverage of the inner electrodes as high as equal to or higher than about 80% and generating no structural defect such as delamination and crack was obtained.

In the cases of the samples of the sample numbers 1 to 5 in Table 1 satisfying the requirements of various preferred embodiments of the present invention, the rate of temperature decrease in the calcination process was as high as about 100° C./min. Therefore, the additive (material forming the segregation with the perovskite compound containing Ba and Ti) in the inner electrodes was easy to remain in the inner electrodes without being cleared off in a temperature decrease process. As a result, the content of the segregation with the perovskite compound containing Ba and Ti, which was scattered in the inner electrodes, was equal to or higher than about 2%, and the coefficient of linear expansion of the inner electrodes (Ni electrodes) was close to the coefficient of linear expansion of the dielectric ceramic layers. It is considered that the structural defects were not easily generated for the above-mentioned reason.

On the other hand, in the cases of the samples of the sample numbers 6 to 10 in which the content of the segregation with the perovskite compound containing Ba and Ti, which was scattered in the inner electrodes, was lower than about 2% or the content of the columnar segregation with the perovskite compound containing Ba and Ti, which penetrated through the inner electrodes from the one main surface side to the other main surface side, was higher than about 5%, that is, in the cases of the samples that did not satisfy the requirements of the invention, the coverage was lowered to lower than about 80% or generation of the structural defects was recognized. As a result, it was confirmed that the samples of the sample numbers 6 to 10 were not preferable.

In the case of the sample of the sample number 6 among the samples of the sample numbers 6 to 10 that did not satisfy the requirements of the present invention, a blending ratio of the additive was too large and a large amount of additive therefore remained in the inner electrodes. With this, the content of the columnar segregation penetrating through the inner electrodes was also equal to or higher than about 5% (8%) and the coverage of the inner electrodes was lowered to about 60%. As a result, it was confirmed that the sample of the sample number 6 was not preferable.

In the case of the sample of the sample number 7, an amount of additive was small and the segregation in the inner electrodes therefore became small. As a result, it was confirmed that structural defects were increased.

Further, in the case of the sample of the sample number 8, the rate of temperature decrease was low. As a result, the additive was cleared off in the temperature decrease process and the abundance ratio of the segregation scattered in the inner electrodes became low. As a result, it was confirmed that the structural defects were increased.

In the cases of the samples of the sample numbers 9 and 10, the thicknesses of the inner electrodes were small. As a result, it was confirmed that the number of generation of structural defects was increased. The result indicates that when the thicknesses of the inner electrodes are decreased, influence by the scattered segregation is large and adverse influence is increased in the case where the thicknesses of the inner electrodes are smaller than the range of the present invention.

Based on the above-mentioned results, the multilayer ceramic capacitor having high reliability is confirmed to be obtained by satisfying the requirements of various preferred embodiments of the present invention that the content of the segregation with the perovskite compound containing Ba and Ti, which is scattered in the inner electrodes, is equal to or higher than about 2% and the content of the columnar segregation with the perovskite compound containing Ba and Ti, which penetrates through the inner electrodes, is equal to or lower than about 5%.

It should be noted that the present invention is not limited to the above-mentioned preferred embodiments and various applications and variations can be added within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic multilayer body including a plurality of dielectric ceramic layers and a plurality of inner electrodes laminated with the dielectric ceramic layers interposed therebetween; and
an outer electrode arranged on the ceramic multilayer body so as to conduct with the inner electrodes; wherein
the dielectric ceramic layers include a perovskite compound containing Ba and Ti; and
the inner electrodes:
  (a) contain Ni as a main component;
  (b) include segregation with a perovskite compound containing Ba and Ti, which is scattered in the inner electrodes so as to be embedded in the inner electrodes, in amount equal to or higher than about 2%;
  (c) include columnar segregation with a perovskite compound containing Ba and Ti, which penetrates through the respective inner electrode from one main surface side to another main surface side, in an amount equal to or lower than about 5%, or do not include the columnar segregation; and
an inner electrode coverage of the inner electrodes is equal to or greater than 80% and equal to or less than 85%, where the inner electrode coverage is a ratio at which the inner electrodes cover the dielectric ceramic layers.

2. The multilayer ceramic capacitor according to claim 1, wherein an average thickness of the inner electrodes is equal to or smaller than about 0.4 μm.

3. The multilayer ceramic capacitor according to claim 1, wherein the outer electrode is a first outer electrode provided on a first end surface of the ceramic multilayer body, and a second outer electrode is provided on a second end surface of the ceramic multilayer body.

4. The multilayer ceramic capacitor according to claim 3, wherein the first outer electrode and the second outer electrode include at least one of Ni plated layers and Sn plated layers.

5. The multilayer ceramic capacitor according to claim 1, wherein the segregation with the perovskite compound containing Ba and Ti is entirely embedded in the inner electrodes.

6. The multilayer ceramic capacitor according to claim 1, wherein the segregation scattered in the inner electrodes is surrounded by the inner electrodes.

7. The multilayer ceramic capacitor according to claim 1, wherein the columnar segregation contacts two of the dielectric ceramic layers located above and below the inner electrodes.

8. The multilayer ceramic capacitor according to claim 1, wherein the segregation with the perovskite compound does not penetrate through the inner electrodes.

9. The multilayer ceramic capacitor according to claim 1, wherein the segregation with the perovskite compound containing Ba and Ti decreases a difference between a coefficient of linear expansion of the inner electrodes and a coefficient of linear expansion of the dielectric ceramic layers.

* * * * *